United States Patent
Moyer et al.

(10) Patent No.: US 11,169,812 B2
(45) Date of Patent: Nov. 9, 2021

(54) THROTTLING WHILE MANAGING UPSTREAM RESOURCES

(71) Applicant: Advanced Micro Devices, Inc., Santa Clara, CA (US)

(72) Inventors: Paul James Moyer, Fort Collins, CO (US); Douglas Benson Hunt, Fort Collins, CO (US); Kai Troester, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/584,701

(22) Filed: Sep. 26, 2019

(65) Prior Publication Data

US 2021/0096873 A1 Apr. 1, 2021

(51) Int. Cl.
*G06F 9/38* (2018.01)

(52) U.S. Cl.
CPC ............ *G06F 9/3855* (2013.01); *G06F 9/384* (2013.01); *G06F 9/3885* (2013.01)

(58) Field of Classification Search
None
See application file for complete search history.

(56) References Cited

U.S. PATENT DOCUMENTS

| | | |
|---|---|---|
| 5,944,816 A | 8/1999 | Dutton et al. |
| 6,826,704 B1 | 11/2004 | Pickett |
| 7,818,747 B1 | 10/2010 | Fedorova et al. |
| 8,286,139 B2 | 10/2012 | Jones et al. |
| 9,529,719 B2 | 12/2016 | Walker |

(Continued)

FOREIGN PATENT DOCUMENTS

| | | |
|---|---|---|
| WO | 2004044745 A1 | 5/2004 |
| WO | 2016210032 A1 | 12/2016 |

OTHER PUBLICATIONS

Haring, Ruud, "The Blue Gene/Q Compute Chip", Hot Chips: A Symposium on High Performance Chips, Aug. 18, 2011, 20 pages, https://www.hotchips.org/wp-content/uploads/hc_archives/hc23/HC23.18.1-manycore/HC23.18.121.BlueGene-IBM_BQC_HC23_20110818.pdf. [Retrieved May 9, 2018].

(Continued)

*Primary Examiner* — Michael Sun
(74) *Attorney, Agent, or Firm* — Rory D. Rankin; Kowert, Hood, Munyon, Rankin & Goetzel, P.C

(57) ABSTRACT

Systems, apparatuses, and methods for arbitrating threads in a computing system are disclosed. A computing system includes a processor with multiple cores, each capable of simultaneously processing instructions of multiple threads. When a thread throttling unit receives an indication that a shared cache has resource contention, the throttling unit sets a threshold number of cache misses for the cache. If the number of cache misses exceeds this threshold, then the throttling unit notifies a particular upstream computation unit to throttle the processing of instructions for the thread. After a time period elapses, if the cache continues to exceed the threshold, then the throttling unit notifies the upstream computation unit to more restrictively throttle the thread by performing one or more of reducing the selection rate and increasing the time period. Otherwise, the unit notifies the upstream computation unit to less restrictively throttle the thread.

20 Claims, 6 Drawing Sheets

(56) References Cited

U.S. PATENT DOCUMENTS

| | | | |
|---|---|---|---|
| 10,417,056 B2* | 9/2019 | Dice | G06F 9/526 |
| 2001/0010069 A1* | 7/2001 | Hetherington | G06F 12/0897 |
| | | | 711/122 |
| 2005/0210471 A1 | 9/2005 | Okawara | |
| 2006/0161920 A1 | 7/2006 | An et al. | |
| 2011/0113199 A1* | 5/2011 | Tang | G06F 12/0862 |
| | | | 711/130 |
| 2012/0047515 A1 | 2/2012 | Kanetomo | |
| 2013/0124826 A1* | 5/2013 | Merchant | G06F 9/3851 |
| | | | 712/205 |
| 2014/0108740 A1* | 4/2014 | Rafacz | G06F 12/0862 |
| | | | 711/137 |
| 2015/0234677 A1 | 8/2015 | Bartley et al. | |
| 2016/0062768 A1* | 3/2016 | Jagannathan | G06F 9/30047 |
| | | | 711/137 |
| 2017/0300357 A1 | 10/2017 | Aberg et al. | |
| 2018/0069767 A1 | 3/2018 | Basu et al. | |
| 2019/0190805 A1* | 6/2019 | Hunt | G06F 11/348 |
| 2019/0317807 A1 | 10/2019 | Basu et al. | |

OTHER PUBLICATIONS

Herbert et al., "Scaling in the Linux Networking Stack", 6 pages, https://www.kernel.org/doc/Documentation/networking/scaling.txt. [Retrieved May 9, 2018].

"Interrupt Moderation Using Intel® GbE Controllers", Intel Corporation, Apr. 2007, 19 pages, Revision 1.2, https://www.intel.co.id/content/dam/doc/application-note/gbe-controllers-interrupt-moderation-appl-note.pdf. [Retrieved May 9, 2018].

León et al., System Noise Revisited: Enabling Application Scalability and Reproducibility with Simultaneous Multithreading, Proceedings of the International Parallel and Distributed Processing Symposium, May 23, 2016, 12 pages, https://e-reports-ext.llnl.gov/pdf/791809.pdf. [Retrieved May 9, 2018].

Mogul et al., "Eliminating Receive Livelock in an Interrupt-driven Kernel". Proceedings of the USENIX Annual Technical Conference, Jan. 1996, 13 pages, https://pdos.csail.mit.edu/6.828/2008/readings/mogul96usenix.pdf. [Retrieved May 9, 2018].

Mogul, Jeffrey C., "TCP Offload is a Dumb Idea Whose Time Has Come". Proceedings of the 9th conference on Hot Topics in Operating Systems, May 18, 2003, 6 pages, https://pdfs.semanticscholar.org/70cd/ec19f689049d85d9b421bdfeca19de4ca3a3.pdf. [Retrieved May 9, 2018].

International Search Report and Written Opinion in International Application No. PCT/US2019/017933, dated May 14, 2019, 14 pages.

Cheng et al., "vBalance: Using Interrupt Load Balance to Improve I/O Performance for SMP Virtual Machines", Proceedings of the Third ACM Symposium on Cloud Computing, SOCC'12, Oct. 14-17, 2012, 14 pages.

Stefanov et al., "Study of CPU Usage Data Properties for Using in Performance Monitoring", Russian Supercomputing Days 2016, Jan. 1, 2016, pp. 36-40, http://russianscdays.org/files/pdf16/36.pdf. [Retrieved May 2, 2019].

McDougall, Richard, "Chapter 3.11: Interrupts", Solaris™ Internals: Solaris 10 and OpenSolaris Kernel Architecture, Jul. 10, 2006, 7 pages, Second Edition, Prentice Hall.

"Exponential backoff", Wikipedia.org, Mar. 13, 2018, 3 pages, https://en.wikipedia.org/w/index.php?title=Exponential_backoff&oldid=830252246. [Retrieved May 2, 2019].

Missimer et al. "Mixed-Criticality Scheduling with I/O", 28th Euromicro Conference on Real-Time Systems, Mar. 12, 2016, 13 pages, https://ieeexplore.ieee.org/iel7/7557819/7557852/07557874.pdf. [Retrieved May 2, 2019].

International Search Report and Written Opinion from PCT/US2020/052786, dated Jan. 13, 2021, Advanced Micro Devices, 1-9 pages.

* cited by examiner

THROTTLING WHILE MANAGING UPSTREAM RESOURCES

BACKGROUND

Description of the Related Art

A processor, such a general-purpose central processing unit, processes instructions of a software application with any number of pipeline stages. These processors include hardware for multiple-instruction issue, dispatch, execution, and retirement; extra routing and logic to determine data forwarding for multiple instructions simultaneously per clock cycle; and intricate branch prediction schemes. In addition, many processors replicate a processor core multiple times in order to increase parallel execution of software applications. To further take advantage of instruction-level parallelism, the processor cores perform simultaneous multithreading.

Depending on the workload, two or more threads in a processor core are capable of competing for a shared resource of the processor core such as an instruction fetch unit (IFU), a branch prediction unit, reservation stations issuing instructions to an integer execution unit or a floating-point unit (FPU), a load queue and a store queue within a load-store unit (LSU), a common data bus transmitting results of executed instructions, or other. In addition, it is possible for threads across two or more processor cores to compete for a shared resource, such as a level-two (L2) or a level-three (L3) cache, a memory bus, an input/output (I/O) device.

Resource contention occurs when a number of computation units requesting access to a shared resource exceeds a number of units that the shared resource may support for simultaneous access. Examples of a computation unit are a hardware thread, a processor core, a microprocessor, or other. Resource contention typically causes a multi-cycle stall. The duration of a resource contention stall depends on the amount of time granted to one or more other computation units currently accessing the shared resource. The stalls resulting from resource contention reduce the benefit of replicating cores or other computation units capable of multi-threaded execution.

In view of the above, efficient methods for arbitrating threads in a computing system are desired.

BRIEF DESCRIPTION OF THE DRAWINGS

The advantages of the methods and mechanisms described herein may be better understood by referring to the following description in conjunction with the accompanying drawings, in which.

Figure 1:
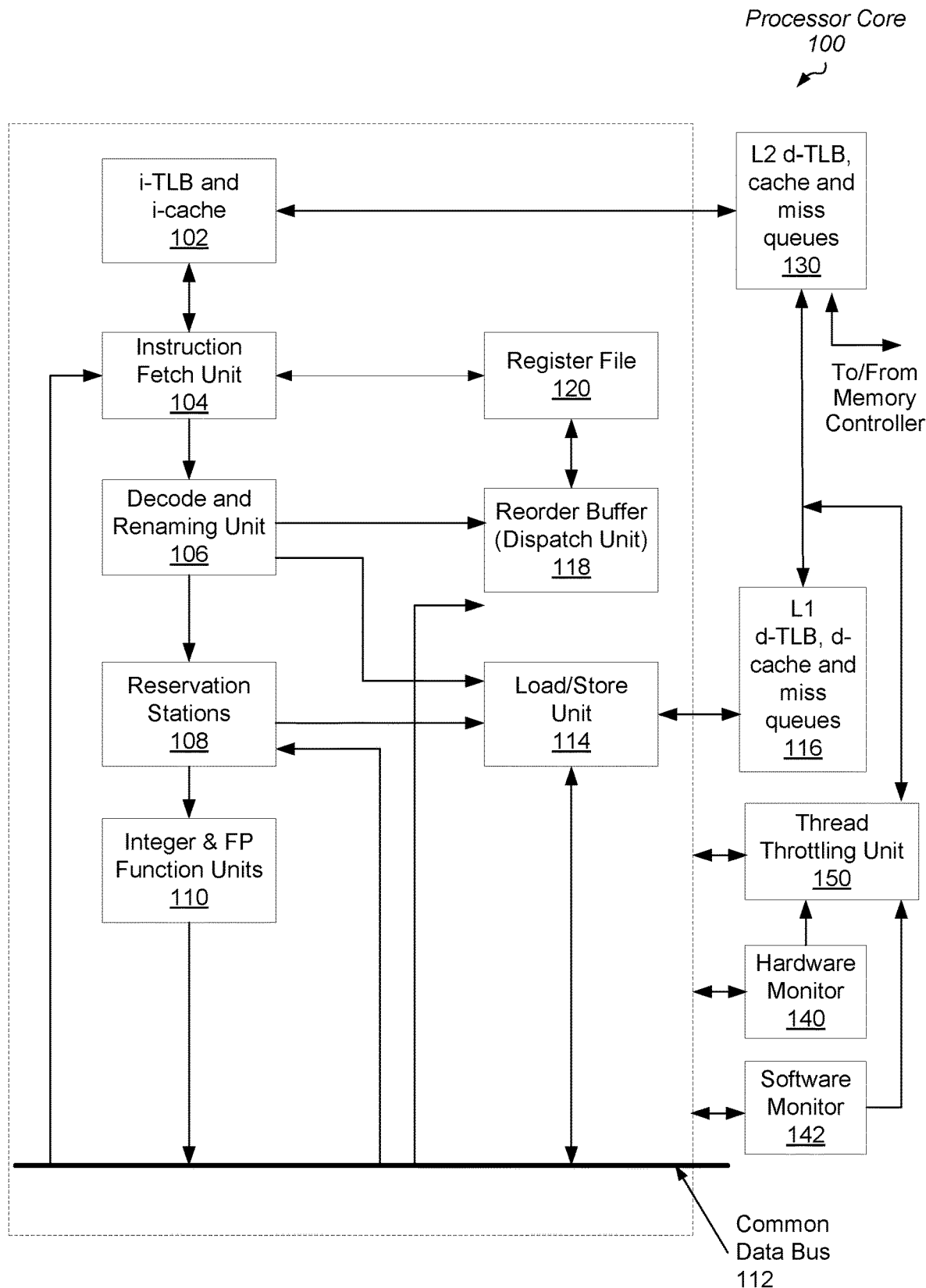
FIG. 1 is a block diagram of one embodiment of a processor core.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for arbitrating threads in a computing system are disclosed. In various embodiments, a computing system includes multiple shared resources. Examples of the resources are the various types of computation units used in a processor core at different stages of instruction processing. The stages include an instruction fetch stage, a decode stage, a dispatch stage and an issue stage, and so on. A multi-threaded operating system or hypervisor divides a software application into multiple processes, each with multiple threads. A scheduler in the operating system or hypervisor manages the assignments of these different software threads to hardware such as particular cores of multiple processor cores of the computing system. The multiple threads in a particular core share the computation units and data storage queues in the core. Another example of the resources are memory controllers and data storage arrays in a hierarchical memory subsystem shared by the multiple cores. The cores include one or more local cache levels of a cache hierarchy, which are shared by the multiple threads in the core, and the computing system includes one or more global cache levels shared by the multiple cores.

Resource contention occurs when a number of sources requesting access to a shared resource exceeds a number of sources that the shared resource supports for simultaneous access. Examples of a source are a thread within a core, a core, or other. A source that is seeking to utilize a shared resource, but is not granted access, stalls. To reduce the penalties of stalls in the computing system, one or more of software monitors and hardware monitors determine whether a particular source (e.g., thread, core, other) qualifies for throttling, or reduction of instruction processing, at a shared resource. However, it is possible that throttling the shared resource causes other resources upstream from the shared resource to stall or reduce performance since the upstream resources are already utilized by the stalled source. As used herein, a "software monitor" includes one of a variety of software used to monitor resource utilization by software threads and identifies a particular thread for throttling such as an operating system, a hypervisor, a basic input output software (BIOS) controlled function, user-level software utilizing application programmer interfaces (APIs), and any other type of software capable of manipulating a configuration of a computing system.

Moving the point of throttling upstream from the shared resource frees some of the upstream resources from resource contention, but it is possible that the thread's performance reduces below a threshold if the point is moved too far upstream. Additionally, it is possible that the original shared resource continues to experience resource contention. In an embodiment, the original shared resource with contention is a core level-two (L2) cache. Other levels of the cache hierarchy are possible and contemplated. Throttling the arbitration of a thread upstream in instruction processing from the L2 cache does not guarantee the number of memory requests conveyed by the L2 cache reduces. The L2 cache receives memory requests from the L1 data cache and the L1 instruction cache. In addition, the L2 cache controller is capable of generating prefetch requests for one or more miss requests being sent to lower level memory such as a level-three (L3) cache or system memory. To balance supporting throttling of the local L2 cache and maintaining a particular memory bandwidth at the L2 cache, the control logic of the core monitors the number of cache misses at the L2 cache, sets a threshold number of cache misses for the thread at the L2 cache a particular cache level.

When the control logic of the core determines or receives an indication specifying a number of cache misses for the particular thread at the L2 cache is greater than the threshold number of cache misses, the control logic notifies a particular upstream computation unit to throttle the processing of instructions for the thread. In one embodiment, the upstream computation unit is the dispatch unit. In another embodiment, the upstream computation unit is the instruction fetch unit, the decode unit, the load/store unit (LSU), or other.

In various embodiments, the control logic of the core sets a severity level of throttling for the upstream computation unit that specifies a selection rate for selecting the instructions of the thread for processing at the computation unit. In addition, the severity level specifies a time period for maintaining the selection rate. When the time period elapses, the control logic updates the severity level to a more restrictive level of throttling if the number of cache misses at the L2 cache is still greater than the threshold number of cache misses. However, if the number of cache misses at the particular cache level is not greater than the threshold number of cache misses, the control logic updates the severity level to a less restrictive level of throttling.

Referring to FIG. 1, one embodiment of a general-purpose processor core 100 that performs out-of-order execution is shown. In one embodiment, processor core 100 simultaneously processes two or more threads. An instruction-cache (i-cache) stores instructions for a software application and a corresponding translation-lookaside-buffer (TLB) stores addresses in order to access the instructions. The instruction fetch unit (IFU) 104 fetches multiple instructions from the i-cache 102 per clock cycle if there are no i-cache misses. The IFU 104 includes a program counter that holds a pointer to an address of the next instructions to fetch in the i-cache 102, which is compared to addresses in the i-TLB. The IFU 104 also includes a branch prediction unit (not shown) to predict an outcome of a conditional instruction prior to an execution unit determining the actual outcome in a later pipeline stage.

The decoder unit 106 decodes the opcodes of the multiple fetched instructions and allocates entries in an in-order retirement queue, such as reorder buffer 118, in reservation stations 108, and in a load/store unit 114. In some embodiments, the decode unit 106 also performs register renaming of instruction operands to remove write-after-read (WAR) and write-after-write (WAW) hazards. In other embodiments, the reorder buffer 118 performs register renaming. When read-after-write (RAW) hazards are removed for instructions, the instructions are allocated in the reservation stations 108. The allocation of entries in the reservation stations 108 is considered dispatch. The reservation stations 108 act as an instruction queue where instructions wait until their operands become available. When operands are available and hardware resources are also available, the logic of the reservations stations 108 issue an instruction out-of-order to the integer and floating-point functional units 110 or to the load/store unit 114.

The functional units 110 include arithmetic logic units (ALU's) for computational calculations such as addition, subtraction, multiplication, division, and square root. Logic may be included to determine an outcome of a conditional instruction. The load/store unit (LSU) 114 receives issued memory accesses such as load and store operations. The load/store unit 114 includes queues and logic to execute a memory access instruction. In an embodiment, the load/store unit 114 includes verification logic to ensure a load instruction receives forwarded data from the correct youngest store instruction.

The functional units 110 and the load/store unit 114 present results on a common data bus 112. The reorder buffer 118 receives results from the common data bus 112. In one embodiment, the reorder buffer 118 is a first-in first-out (FIFO) queue that ensures in-order retirement of instructions according to program order. Here, an instruction that receives its results is marked for retirement. If the instruction is head-of-the-queue, logic of the reorder buffer 118 sends its results to the register file 120. The register file 120 holds the architectural state of the general-purpose registers of processor core 100. Then the instruction in the reorder buffer 118 retires in-order and logic updates its head-of-queue pointer to point to the subsequent instruction in program order.

The results on the common data bus 112 are also sent to the reservation stations 108 in order to forward values to operands of instructions waiting for the results. When these waiting instructions have values for their operands and hardware resources are available to execute the instructions, they may be issued out-of-order from the reservation stations 108 to the appropriate resources in the functional units 110 or the load/store unit 114. Uncommitted, or non-retired, memory access instructions have entries in the load/store unit. The forwarded data value for an in-flight, or uncommitted, load instruction from the youngest uncommitted older store instruction is placed on the common data bus 112 or simply routed to the appropriate entry in a load buffer within the load/store unit 114.

The load/store unit 114 sends memory access requests to the level-one (L1) data cache (d-cache) 116 on the chip. In some embodiments, the core 100 also includes a level-two (L2) cache 130 for servicing memory requests from the L1 data cache 116 and the instruction cache 102, which is also an L1 cache. Each of the L1 data cache 116 and the L2 cache 130 has its own TLB for address comparisons with received memory requests. Cache controllers of the L1 data cache 116 and the L2 cache 130 search a data array in a serial or parallel manner. If the requested memory line is not found in the L1 data cache 116 or the instruction cache 102, then the corresponding cache controller sends a miss request is sent to the L2 cache 130.

If the requested memory line is not found in the L2 cache 130, then the L2 cache controller sends a miss request to access memory in lower level memory such as a level-three (L3) cache or system memory. In various embodiments, the core 100 and other external cores share the lower level memory. The wait for the requested memory line to arrive from lower level memory typically requires a substantial number of clock cycles. To reduce performance degradation from this wait, in some embodiments, the L2 cache controller generates one or more prefetch requests for one or more miss requests. The L2 cache controller updates the number of prefetch requests based on a number of accesses within an address range, an amount of time since the address range was accessed, a process identifier (ID) or a thread ID, priority levels, and so on. This information is unknown to the cache controllers of the L1 data cache 116 and the instruction cache 102 and to the load/store unit 114.

Multiple threads share multiple resources within core 100. For example, these multiple threads share each of the blocks 102-130 shown in FIG. 1. In an embodiment, hardware monitor 140 collects data to assist tuning and understanding the behavior of software applications and hardware resource utilization on core 100. Additionally, some events are inconvenient to measure in software such as peak memory contention or response time to invoke an interrupt handler. The hardware, such as circuitry, in the hardware monitor 140 expand the variety and detail of measurements with little or no impact on application performance. Based upon information provided by one or more of the hardware monitor 140 and a software monitor 142, the thread throttling unit 150 manages instruction throttling of one or more of the blocks 102-130.

In one embodiment, the hardware monitor 140 includes counters for counting the number of processor cycles spent performing pipeline flushes, data cache snoops and snoop hits, cache and TLB misses and miss rates, read and write operations, data cache lines written back, branch operations, taken branch operations, the number of instructions in an integer or floating-point pipeline, bus utilization and utilization of a variety of queues. As described earlier, the software monitor 142 includes one of a variety of software used to monitor resource utilization by software threads and identifies a particular thread for throttling. Examples of the software monitor 142 are an operating system, a hypervisor, a basic input output software (BIOS) controlled function, user-level software utilizing application programmer interfaces (APIs), and any other type of software capable of adjusting a configuration of a computing system. Each of the hardware monitor 140, the software monitor 142, and the thread throttling unit 150 are shown located outside of the processing blocks 102-130 of processor core 100 for illustrative purposes. In other embodiments, the functionality of one or more of the hardware monitor 140, the software monitor 142, and the thread throttling unit 150 are integrated throughout the floorplan of core 100. Alternatively, portions of the hardware monitor 140 and the thread throttling unit 150 reside both within core 100 and externally from core 100. All such combinations are contemplated.

The functionality of the thread throttling unit 150 is implemented in hardware, such as circuitry, one of a variety of types of software, or both. In various embodiments, the thread throttling unit 150 receives an indication specifying that one or more shared resources corresponding to one of the blocks 102-130 is utilized by a particular thread above a threshold utilization. One or more of the hardware monitor 140 and the software monitor 142 sends the indication to the thread throttling unit 150. In one embodiment, the identified shared resource is the L2 cache 130 with one or more queues shared by multiple threads. In an embodiment, the thread throttling unit 150 sets a threshold number of cache misses for the particular thread at the L2 cache 130. Afterward, when the thread throttling unit 150 determines or receives an indication specifying a number of cache misses for the particular thread at the L2 cache is greater than the threshold number of cache misses, the thread throttling unit 150 notifies a particular upstream computation unit to throttle the processing of instructions for the particular thread. In one embodiment, the upstream computation unit is the reorder buffer (dispatch unit) 118. In another embodiment, the upstream computation unit is the instruction fetch unit 104, the decode unit 106, the load/store unit (LSU) 114, or other.

Although the reorder buffer 118 is used in the following description, in other embodiments, another upstream computation unit is used. In various embodiments, the thread throttling unit 150 sets a severity level of throttling for the reorder buffer 118 that specifies a selection rate for selecting the instructions of the thread for processing at the reorder buffer 118. In addition, the severity level specifies a time period for maintaining the selection rate. The severity level is also referred to as the level of throttling. When the time period elapses, the thread throttling unit 150 updates the severity level to a more restrictive level of throttling if the number of cache misses at the L2 cache 130 is still greater than the threshold number of cache misses. However, if the number of cache misses at the L2 cache 130 is not greater than the threshold number of cache misses, the thread throttling unit 150 updates the severity level to a less restrictive level of throttling. A more restrictive level of throttling has a selection rate that is less than the current selection rate. In some embodiments, the time period corresponding to the more restrictive level of throttling is greater than the current time period. In contrast, a less restrictive level of throttling has a selection rate that is greater than the current selection rate. In some embodiments, the time period corresponding to the less restrictive level of throttling is less than the current time period.

In order for the data to be accessed, such as by an operating system, another software monitor 142, or a software programmer, in one embodiment, one or more of the hardware monitor 140 and the thread throttling unit 150 includes monitoring output pins. The output pins toggle after a predetermined event, a counter overflow, status information, or other. By wiring one of these pins to an interrupt pin, software becomes reactive to the reported data. In another embodiment, specific instructions are included in an instruction set architecture (ISA) in order to disable and enable data collection, respectively, and to read one or more specific registers in one or more of the hardware monitor 140 and the thread throttling unit 150.

In some embodiments, kernel-level support is needed to access these registers. For example, a program needs to be in supervisor mode and perform a system call to access these registers. In yet another embodiment, an operating system provides one or more application programming interfaces (APIs) corresponding to one or more of the hardware monitor 140, the software monitor 142, and the thread throttling unit 150. The APIs allow configurable threshold values, thread arbitration rates and time periods corresponding to resource contention severity levels to be programmed.

Figure 2:
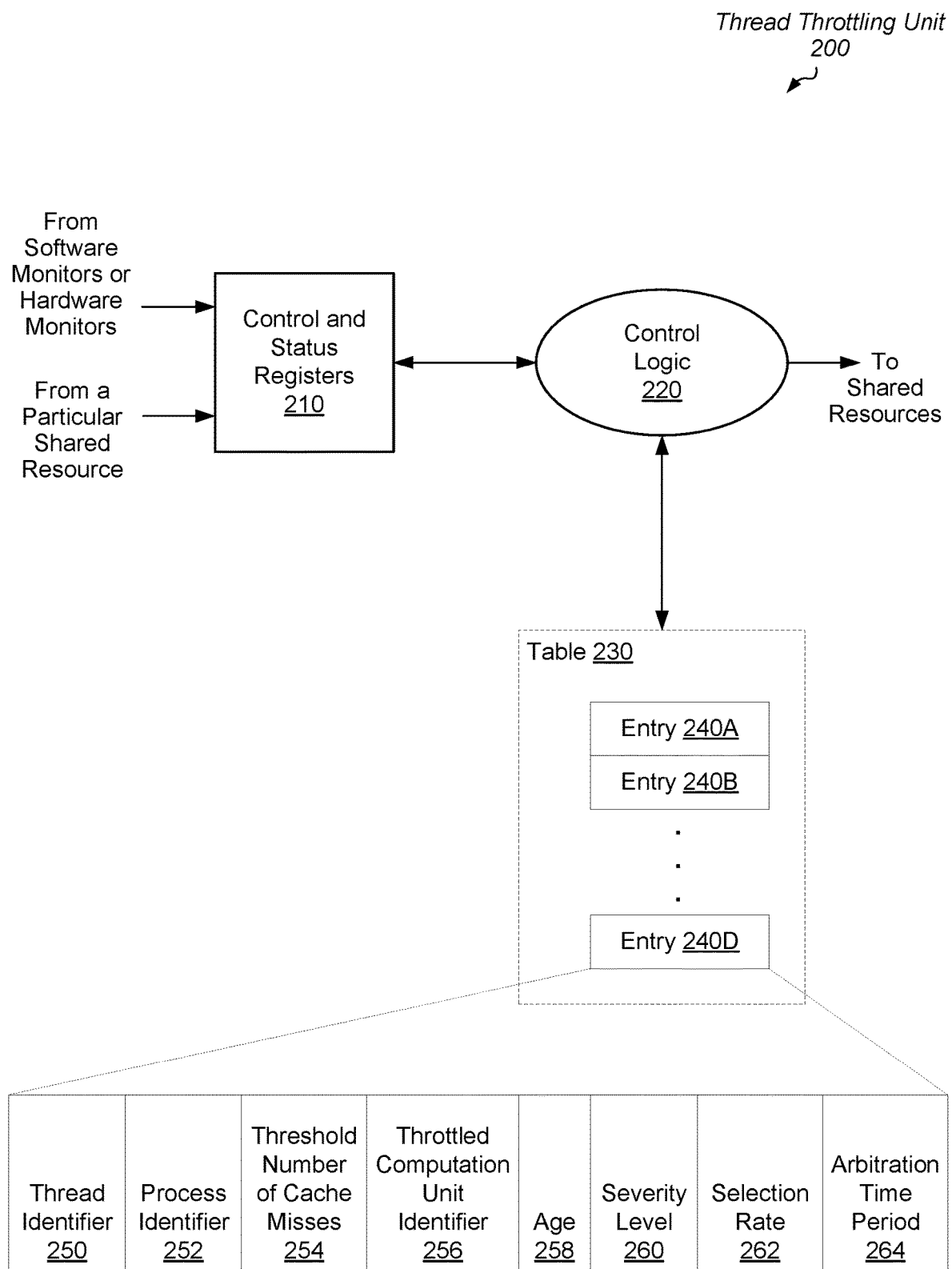
FIG. 2 is a block diagram of one embodiment of control logic for thread arbitration in a computing system.

Turning now to FIG. 2, a generalized block diagram of one embodiment of a thread throttling unit 200 is shown. The thread throttling unit 200 (or unit 200) includes control and status registers 210, control logic 220 and table 230. The control logic 220 is implemented in hardware, such as circuitry, software such as firmware, or both. The control and status registers receive information from one or more of a software monitor and a hardware monitor. Examples of the information are an indication specifying a particular thread requiring throttling, identification of a shared resource experiencing resource contention, selection rates and time periods to use during thread arbitration at an identified shared resource, measured utilization or another indicator of a severity level of resource contention, other thresholds, and so on.

Additionally, the control and status registers 210 receive information from a particular shared resource. One example of the shared resource is a particular cache level of a multi-level cache hierarchy. The table 230 includes multiple entries 240A-240D. One of a variety of data storage structures is used to implement the table 230. Examples of the structures are flip-flop registers, one of a variety of random access memory (RAM), content addressable memory (CAM), and so forth. As shown, each of the entries 240A-240D includes multiple fields. Although fields 250-264 are shown in a contiguous manner, in other embodiments, another number of fields is used and the storage arrangement is different than the one shown and possibly using a non-contiguous storage between some fields.

Control logic 220 or control logic within the table 230 allocates an entry of entries 240A-240D when a thread has been identified for requiring throttling. Field 250 stores a thread identifier identifying the thread, and field 252 stores a process identifier of the process from which the thread was originated. When the particular shared resource experiencing resource contention is a cache level, field 254 stores a threshold number of cache misses for the cache level. Field 256 stores an identifier identifying the throttled computation unit. This computation unit processes instructions upstream from the shared resource experiencing resource contention. In one embodiment, the shared resource experiencing resource contention is an L2 cache in a core and the upstream computation unit to be throttled is a dispatch unit in the core. Field 258 stores an indication of an age of the table entry.

Field 260 stores a severity level indicating how strongly the thread requires to be throttled. In one embodiment, the severity level is based on utilization measurements of the shared resource, throughput or bandwidth of the shared resource, and duration of the resource contention. One or more of an external software monitor, the external hardware monitor and control logic 220 sets the severity level. Field 262 stores the selection rate for selecting instructions of the thread for processing at a particular upstream computation unit. Field 264 stores an arbitration time period for maintaining the selection rate. Fields 262 and 264 are set by the severity level stored in field 260. In various embodiments, the values stored in fields 262 and 264 are read from registers in the control and status registers 210.

Figure 3:
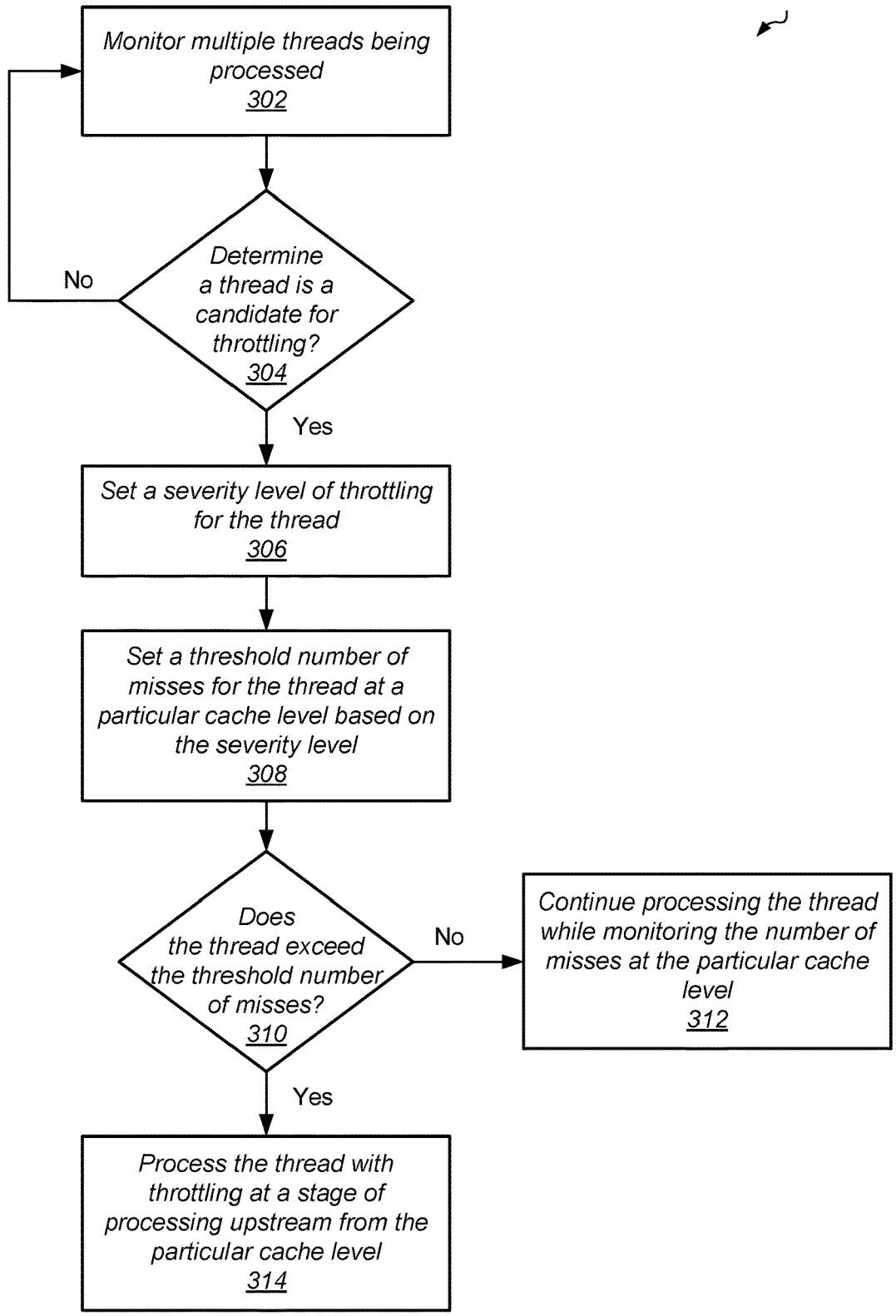
FIG. 3 is a flow diagram of one embodiment of a method for thread arbitration in a computing system.

Referring now to FIG. 3, one embodiment of a method 300 for arbitrating threads in a computing system is shown. For purposes of discussion, the steps in this embodiment (as well as in FIGS. 4-5) are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 300.

A multi-threaded software application generates multiple software processes within the same application. A multi-threaded operating system divides a software application into multiple processes, each with multiple threads. A scheduler in the operating system manages the assignments of these different software threads to hardware such as particular cores of multiple processor cores of the computing system. One or more of hardware and software monitors the multiple threads being processed (blocks 302). For example, a scheduler of the operating system is capable of monitoring. Other types of software monitors include at least a hypervisor, a basic input output software (BIOS) controlled function, and user-level software utilizing application programmer interfaces (APIs). Similarly, dedicated hardware monitors in the processor core are capable of measuring contention of resources shared by multiple threads on the core.

One or more of the software monitors and the hardware monitors are capable of determining if a thread qualifies to be a candidate for throttling. In an embodiment, the operating system or other software manages an architecturally defined quality of service (QoS) target for memory bandwidth for particular threads. The particular threads are spawned from processes of software applications that need to meet the QoS memory bandwidth requirement. When another thread consumes resources, such as occupation of a queue or bus utilization, that causes other particular threads to fail to meet the QoS memory bandwidth requirement, the operating system or other software identifies the resource-consuming thread as a candidate for throttling. Similarly, in some embodiments, the hardware monitors compare resource consumption, such as queue occupation, bus utilization, or other, to thresholds. When a particular thread surpasses one or more thresholds, the hardware monitors identify the resource-consuming thread as a candidate for throttling. When one or more of the operating system and the hardware monitors determine a particular thread qualifies to be a candidate for throttling, an indication is sent to control logic in the core.

If no threads in a core is a candidate for throttling ("no" branch of the conditional block 304), then control flow of method 300 returns to block 302. However, if a thread of the multiple threads in a core is a candidate for throttling ("yes" branch of the conditional block 304), then control logic of the core sets a severity level of throttling for the thread (block 306). The control logic sets a threshold number of misses for the thread at a particular cache level based on the severity level (block 308). In an embodiment, the particular cache level is a cache level where the number of memory access requests generated by the particular cache level, especially due to speculative prefetch requests, is unknown to higher levels of the cache hierarchy. For example, the cache controller generates one or more prefetch requests for one or more miss requests, so the actual number of memory requests issued from the particular cache level is unknown to higher levels of the cache hierarchy.

In one embodiment, one of the software monitors and the hardware monitors determines the threshold number of misses for the thread at the particular cache level. During processing of the instructions of the thread, if the number of cache misses at the particular cache level is not greater than the threshold number ("no" branch of the conditional block 310), then the control logic continues processing the thread while one or more of the control logic and the cache controller monitors the number of cache misses at the particular cache level (block 312). If the number of cache misses at the particular cache level is greater than the threshold number ("yes" branch of the conditional block 310), then the control logic causes the thread to be processed with throttling at a stage of processing upstream from the particular cache level (block 314).

Figure 4:
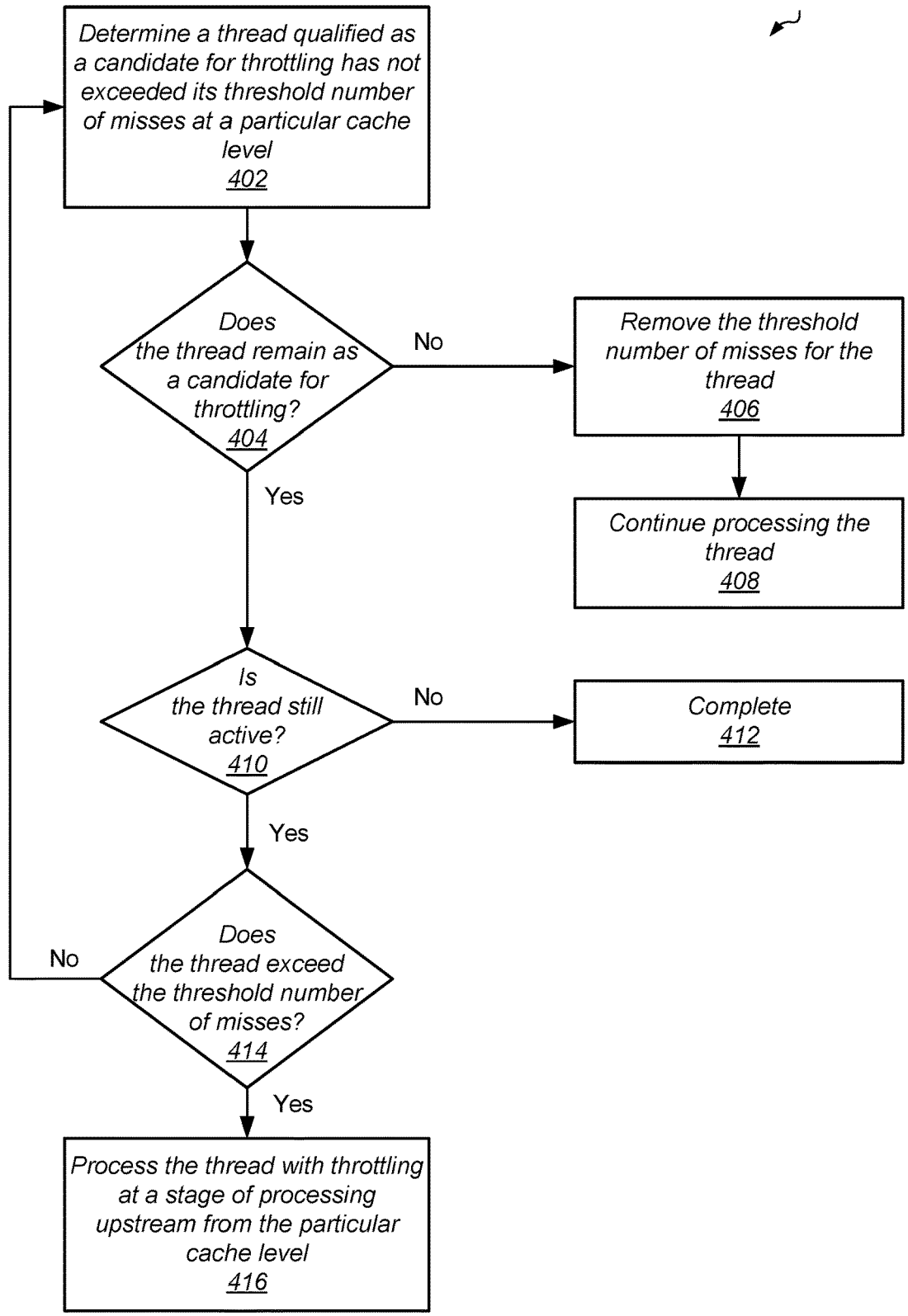
FIG. 4 is a flow diagram of one embodiment of a method for thread arbitration in a computing system.

Turning to FIG. 4, one embodiment of a method 400 for arbitrating threads in a computing system is shown. A processor core processes instructions of multiple threads.

Control logic of the core identifies a thread that qualifies as a candidate for throttling and has not exceeded its threshold number of misses at a particular cache level (block 402). This identification in block 402 generally corresponds to the control flow of the "no" branch of block 310 to the block 312 of method 300 (of FIG. 3). If the control logic determines the thread does not remain as a candidate for throttling ("no" branch of the conditional block 404), then the control logic removes the threshold number of misses for the thread (block 406). For example, one or more of the control logic and the cache controller at the particular cache level resets the threshold number to a default maximum value, or otherwise invalidates the threshold number for the thread. In an embodiment, one or more of the software monitors and hardware monitors determine the thread is no longer a candidate and notifies the control logic. In another embodiment, the control logic determines the thread did not exceed its threshold number of cache misses for a duration of time that exceeds a limit. After removing the threshold number of cache misses for the thread, the core continues processing the thread (block 408).

If the control logic determines the thread remains as a candidate for throttling ("yes" branch of the conditional block 404), but the thread completed so the thread is no longer active ("no" branch of the conditional block 410), then method 400 completes (block 412). If the control logic determines the thread remains as a candidate for throttling ("yes" branch of the conditional block 404), and the thread is still active ("yes" branch of the conditional block 410), then the logic determines whether the thread has generated a number of cache misses at the particular cache level that exceeds its threshold number of cache misses.

If the number of cache misses for the thread at the particular cache level is not greater than the threshold number of misses ("no" branch of the conditional block 414), then control flow of method 400 returns to block 402 where instructions of the thread continue to be processed while the thread has not yet exceeded its threshold number of cache misses at the particular cache level. If the number of cache misses for the thread at the particular cache level is greater than the threshold number of misses ("yes" branch of the conditional block 414), then the core processes the thread with throttling at a stage of processing upstream from the particular cache level (block 416). Further details for throttling are provided in method 500.

Figure 5:
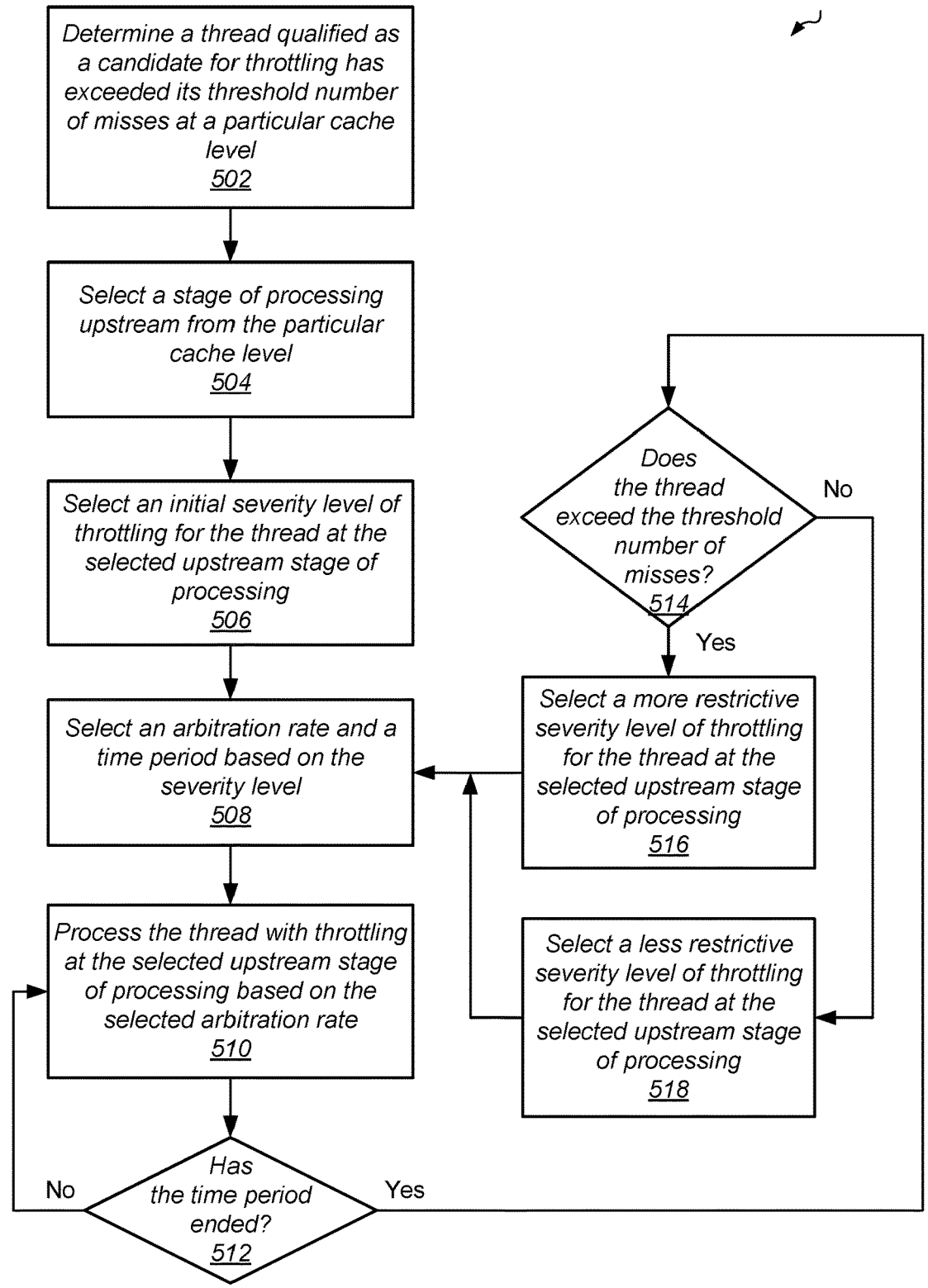
FIG. 5 is a flow diagram of one embodiment of a method for thread arbitration in a computing system.

Turning to FIG. 5, one embodiment of a method 500 for arbitrating threads in a computing system is shown. A processor core processes instructions of multiple threads. Control logic of the core identifies a thread that qualifies as a candidate for throttling and has exceeded its threshold number of misses at a particular cache level (block 502). Control logic of the core selects a stage of processing upstream from the particular cache level (block 504). A computation unit is referred to as an "upstream" computation unit when the computation unit processes instructions at a stage of instruction processing earlier than data is accessed at the particular cache level. In one embodiment, the control logic notifies the dispatch unit located upstream in instruction processing from the particular cache level. In another embodiment, the control logic notifies another upstream computation unit such as the instruction fetch unit, the decode unit, the load/store unit (LSU), or other.

Control logic of the core selects an initial severity level of throttling for the thread at the selected upstream stage of processing (block 506). The control logic selects a selection rate (or arbitration rate) to use during arbitration of multiple threads for accessing shared resources. Additionally, the control logic selects a time period based on the severity level (block 508). In an embodiment, the control logic sets the selection rate to be a maximum of a first number of instructions out of a second number of clock cycles. Each of the first number and the second number is stored in programmable configuration registers such as control and status registers. In one embodiment, the second number of clock cycles is an exponential value based on a severity level. An example of the second number of clock cycles is the value 2 raised to the power of an indication of the severity level. Therefore, a severity level of 1 provides a second number of clock cycles of 2^1, or 2 cycles. A more restrictive severity level of 2 provides a second number of clock cycles of 2^2, or 4 cycles. A yet more restrictive severity level of 3 provides a second number of clock cycles of 2^3, or 8 cycles, and so on. In an embodiment, the selected time period for using the selection rate is an integer multiple of the second number. For a severity level of 3, a second number of clock cycles being 8 cycles, and an integer multiple of 5, the time period is 8 times 5, or 40 cycles.

The core processes the thread with throttling at the selected upstream stage of processing based on the selected arbitration rate (block 510). If the time period has not elapsed ("no" branch of the conditional block 512), then control flow of method 500 returns to block 510 where the core continues processing the thread with throttling. If the time period has elapsed ("yes" branch of the conditional block 512), but the thread does not generate a number of cache misses at the particular cache level that is greater than the threshold number of cache misses ("no" branch of the conditional block 514), then the control logic selects a less restrictive severity level of throttling for the thread at the selected upstream stage of processing (block 518). Afterward, control flow of method 500 returns block 508 where control logic selects an arbitration rate and a time period based on the severity level.

If the time period has elapsed ("yes" branch of the conditional block 512), and the thread generates a number of cache misses at the particular cache level that is greater than the threshold number of cache misses ("yes" branch of the conditional block 514), then the control logic selects a more restrictive severity level of throttling for the thread at the selected upstream stage of processing (block 518). Afterward, control flow of method 500 returns block 508 where control logic selects an arbitration rate and a time period based on the severity level.

Figure 6:
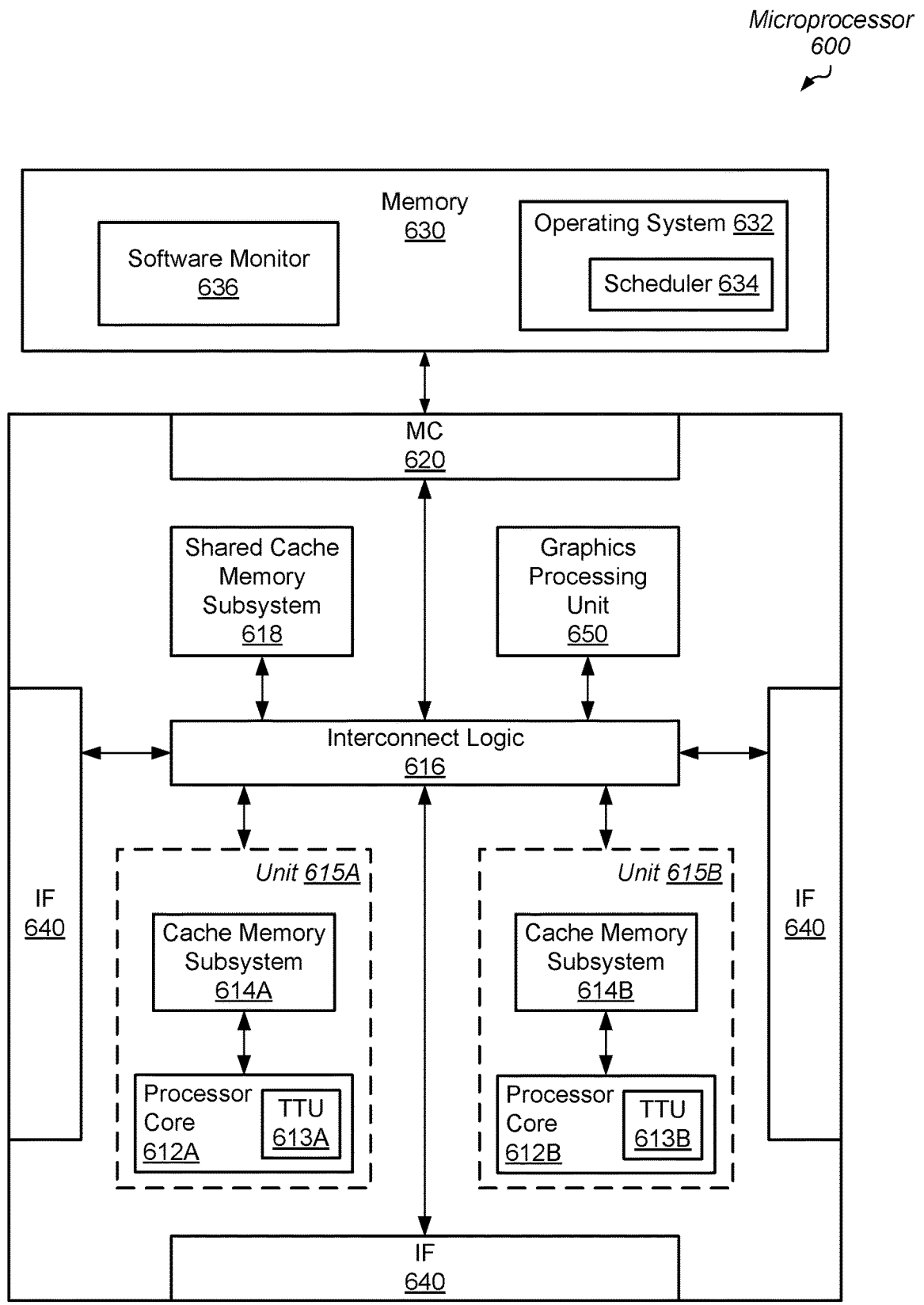
FIG. 6 is a block diagram of one embodiment of a microprocessor.

Referring to FIG. 6, one embodiment of an exemplary microprocessor 600 is shown. Microprocessor 600 includes memory controller 620 coupled to memory 630, interface logic 640, one or more processing units 615A-615B, which include one or more processor cores 612A-612B and corresponding cache memory subsystems 614A-614B; crossbar interconnect logic 616, a shared cache memory subsystem 618, and a shared graphics processing unit (GPU) 650. Memory 630 is shown to include operating system code 632. The operating system 632 includes a scheduler 634 for assigning software threads to hardware in the microprocessor 600. In addition, memory 620 includes a software monitor 636. Examples of the software monitor 636 are a hypervisor, a basic input output software (BIOS) controlled function, user-level software utilizing application programmer interfaces (APIs), and any other type of software capable of adjusting a configuration of microprocessor 600. It is noted that various portions of the operating system code 632 and the software monitor 636 reside in memory 630, in one or more caches (614A-614B, 618), stored on a nonvolatile storage device such as a hard disk (not shown), and so on. In one embodiment, the illustrated functionality of microprocessor 600 is incorporated upon a single integrated circuit.

The GPU 650 may include one or more graphic processor cores and data storage buffers dedicated to a graphics rendering device for a personal computer, a workstation, or a video game console. Interface 640 generally provides an interface for input/output (I/O) devices off the microprocessor 600 to the shared cache memory subsystem 618 and processing units 615A-615B. I/O devices include peripheral network devices such as printers, keyboards, monitors, cameras, card readers, hard or floppy disk drives or drive controllers, network interface cards, video accelerators, audio cards, modems, a variety of data acquisition cards.

The I/O devices are shared by each of the processing units 615A-615B and the GPU 650 of microprocessor 600. Additionally, these I/O devices are shared by processing units 615A-615B in other microprocessors. Interface 640 is used to communicate with these other microprocessors and/or other processing nodes. Generally, interface logic 640 includes buffers for receiving packets from a corresponding link and for buffering packets to be transmitted upon a corresponding link. Any suitable flow control mechanism is used for transmitting packets to and from microprocessor 600, and interconnect logic 616 supports the mechanism.

Microprocessor 600 is connected to a respective memory via a respective memory controller 620. The memory uses any of variety of types of memory devices. The address space of microprocessor 600 is divided among multiple memories. Each microprocessor 600 or a respective processing node, which includes microprocessor 600, uses a memory map used to determine which addresses are mapped to which memories, and hence to which microprocessor 600 or processing node a memory request for a particular address should be routed. In one embodiment, the coherency point for an address is the memory controller 620 connected to the memory storing bytes corresponding to the address. Memory controller 620 includes control circuitry for interfacing to memories and request queues for queuing memory requests.

Cache memory subsystems 614A-614B and 618 use high speed cache memories for storing blocks of data. In some embodiments, cache memory subsystems 614A-614B are integrated within respective processor cores 612A-612B. Alternatively, cache memory subsystems 614A-614B connected to processor cores 612A-612B in a backside cache configuration or an inline configuration, as desired. In various embodiments, cache memory subsystems 614A-614B are implemented as a hierarchy of caches. Caches, which are nearer processor cores 612A-612B (within the hierarchy), are integrated into processor cores 612, if desired. In one embodiment, cache memory subsystems 614A-614B each represent L2 cache structures, and shared cache subsystem 618 represents an L3 cache structure.

Processor cores 612A-612B include circuitry for executing instructions according to a predefined general-purpose instruction set, and the processor cores 612A-612B support simultaneous multi-threading. In various embodiments, the processor cores 612A-612B have the equivalent functionality as processor core 100 (of FIG. 1). Similarly, the thread throttling units 613A-613B (or TTUs 613A-613B) have the same functionality as the thread throttling unit 150 (of FIG. 1) and thread throttling unit 200 (of FIG. 2). The multiple threads executed by processor cores 612A-612B share at least the shared cache memory subsystem 618, the graphics processing unit (GPU) 650, and the coupled I/O devices.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors that execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
   a plurality of computation units, each configured to process instructions;
   a cache configured to store data; and
   control circuitry configured to:
   receive an indication that a given thread is a candidate for throttling;
   set a threshold number of cache misses for the given thread of a plurality of threads, responsive to identifying the given thread as a candidate for throttling; and
   in response to determining a number of cache misses of the given thread is greater than the threshold number of cache misses, throttle a number of instructions to process by the given thread at a given computation unit of the plurality of computation units.

2. The apparatus as recited in claim 1, wherein the given computation unit processes instructions at a stage of instruction processing earlier than data is accessed at the cache.

3. The apparatus as recited in claim 1, wherein the control circuitry is further configured to set a level of throttling comprising:
   a selection rate for selecting the instructions of the given thread for processing at the given computation unit; and
   a time period for maintaining the selection rate.

4. The apparatus as recited in claim 3, wherein the control circuitry is further configured to update the level of throttling to a more restrictive level of throttling by performing one or more of reducing the selection rate and increasing the time period, in response to determining:
   the time period has elapsed; and
   the number of cache misses at the cache is greater than the threshold number of cache misses after the time period elapsed.

5. The apparatus as recited in claim 3, wherein the control circuitry is further configured to update the level of throttling to a less restrictive level of throttling by performing one or more of increasing the selection rate and decreasing the time period, in response to determining:
   the time period has elapsed; and
   the number of cache misses at the cache is not greater than the threshold number of cache misses after the time period elapsed.

6. The apparatus as recited in claim 1, wherein the control circuitry is further configured to allow the cache to process a number of cache misses greater than the threshold number of cache misses.

7. The apparatus as recited in claim 1, wherein the indication is generated based at least in part on a quality of service of a thread of the plurality of threads.

8. The apparatus as recited in claim 2, wherein the stage of instruction processing comprises one of an instruction fetch stage, a decode stage, a dispatch stage and an issue stage.

9. A method, comprising:
processing instructions by a plurality of computation units;
storing data by a cache;
receiving an indication that a given thread is a candidate for throttling;
setting, by control logic, a threshold number of cache misses for the given thread of a plurality of threads, responsive to identifying the given thread as a candidate for throttling; and
in response to determining, by the control logic, a number of cache misses of the given thread is greater than the threshold number of cache misses, throttling a number of instructions to process by the given thread at a given computation unit of the plurality of computation units.

10. The method as recited in claim 9, further comprising processing instructions, by the given computation unit, at a stage of instruction processing earlier than data is accessed at the cache.

11. The method as recited in claim 9, further comprising setting a level of throttling comprising:
a selection rate for selecting the instructions of the given thread for processing at the given computation unit; and
a time period for maintaining the selection rate.

12. The method as recited in claim 11, further comprising updating the level of throttling to a more restrictive level of throttling by performing one or more of reducing the selection rate and increasing the time period, in response to determining:
the time period has elapsed; and
the number of cache misses at the cache is greater than the threshold number of cache misses after the time period elapsed.

13. The method as recited in claim 11, further comprising updating the level of throttling to a less restrictive level of throttling by performing one or more of increasing the selection rate and decreasing the time period, in response to determining:
the time period has elapsed; and
the number of cache misses at the cache is not greater than the threshold number of cache misses after the time period elapsed.

14. The method as recited in claim 9, wherein the indication is generated based at least in part on a quality of service of a thread of the plurality of threads.

15. The method as recited in claim 10, wherein the stage of instruction processing comprises one of an instruction fetch stage, a decode stage, a dispatch stage and an issue stage.

16. A non-transitory computer readable storage medium storing program instructions configured to perform thread arbitration, wherein the program instructions are executable to:
process instructions by a plurality of computation units;
store data by a cache;
detect a received indication that a given thread is a candidate for throttling;
set a threshold number of cache misses for the given thread of a plurality of threads, responsive to identifying the given thread as a candidate for throttling; and
in response to determining a number of cache misses of the given thread is greater than the threshold number of cache misses, throttle a number of instructions to process by the given thread at a given computation unit of the plurality of computation units.

17. The non-transitory computer readable storage medium as recited in claim 16, wherein the given computation unit processes instructions at a stage of instruction processing earlier than data is accessed at the cache.

18. The non-transitory computer readable storage medium as recited in claim 16, wherein the program instructions are further executable to set a severity level of throttling comprising:
a selection rate for selecting the instructions of the given thread for processing at the given computation unit; and
a time period for maintaining the selection rate.

19. The non-transitory computer readable storage medium as recited in claim 18, wherein the program instructions are further executable to update the level of throttling to a more restrictive level of throttling by performing one or more of reducing the selection rate and increasing the time period, in response to determining:
the time period has elapsed; and
the number of cache misses at the cache is greater than the threshold number of cache misses after the time period elapsed.

20. The non-transitory computer readable storage medium as recited in claim 18, wherein the program instructions are further executable to update the level of throttling to a less restrictive level of throttling by performing one or more of increasing the selection rate and decreasing the time period, in response to determining:
the time period has elapsed; and
the number of cache misses at the cache is not greater than the threshold number of cache misses after the time period elapsed.

* * * * *